(12) United States Patent
Patz

(10) Patent No.: US 8,118,445 B1
(45) Date of Patent: Feb. 21, 2012

(54) VANITY LIGHT SYSTEM

(76) Inventor: Alvin A. Patz, Mesa, AZ (US)

( * ) Notice: Subject to any disclaimer, the term of this patent is extended or adjusted under 35 U.S.C. 154(b) by 0 days.

(21) Appl. No.: 12/880,067

(22) Filed: Sep. 11, 2010

Related U.S. Application Data

(60) Provisional application No. 61/246,682, filed on Sep. 29, 2009.

(51) Int. Cl.
*F21V 33/00* (2006.01)
(52) U.S. Cl. .......................... 362/136; 362/135
(58) Field of Classification Search .............. 362/125, 362/128, 129, 133, 135–143, 220, 217.02, 362/217.03, 217.04, 217.05, 249.01, 249.02, 362/249.03, 249.07, 276, 277, 279, 282, 362/285, 288
See application file for complete search history.

(56) References Cited

U.S. PATENT DOCUMENTS

| 3,714,411 | A | * | 1/1973 | Waters et al. | 362/137 |
|---|---|---|---|---|---|
| 4,752,863 | A | | 6/1988 | Parrott | |
| 4,951,181 | A | | 8/1990 | Phillips | |
| 7,481,548 | B2 | * | 1/2009 | Tokushita | 362/136 |
| 7,494,258 | B2 | | 2/2009 | McNaught et al. | |
| 7,510,309 | B1 | | 3/2009 | Rizzo et al. | |
| 7,511,231 | B2 | | 3/2009 | Drane et al. | |

FOREIGN PATENT DOCUMENTS

| JP | 09084639 A | * | 3/1997 |
|---|---|---|---|
| JP | 2000304910 A | * | 11/2000 |
| JP | 2000338449 A | * | 12/2000 |

* cited by examiner

*Primary Examiner* — Hargobind S Sawhney
(74) *Attorney, Agent, or Firm* — Kenneth L Tolar

(57) ABSTRACT

A light system for a vanity having a horizontal counter top with a wash basin positioned therein. Mounted on a wall, adjacent the counter top, is a mirror for reflecting a person's image. Along an upper edge of the mirror is a horizontal row of lights, similar to those typically mounted above conventional vanities. At least two light housings angularly depend from the lower surface of the counter top, each including an interior chamber, an open top and an outer wall. Received within the interior chamber is a compact fluorescent lamp removably mounted within a conventional light socket. An opening is formed on the counter top, immediately above the open top of each housing, for receiving a tempered-glass panel. Accordingly, activating the angled lamps and the conventional overhead lights illuminates a user's entire face thereby allowing the user to gauge the appearance of makeup in daylight conditions.

5 Claims, 2 Drawing Sheets

VANITY LIGHT SYSTEM

CROSS REFERENCE TO RELATED APPLICATIONS

This application is entitled to the benefit of provisional application No. 61/246,682 filed on Sep. 29, 2009, the specification of which is incorporated herein by reference.

BACKGROUND OF THE INVENTION

The present invention relates to a vanity light system that minimizes shadowing of certain facial features.

DESCRIPTION OF THE PRIOR ART

Conventional vanity lights are typically arranged in a horizontal row above a mirror for projecting light downwardly; when a person stands in front of the mirror to apply makeup, the downwardly-projecting light beams sometimes shadow certain facial features, which is aggravating and inconvenient. Furthermore, a user cannot accurately gauge the appearance of makeup in daylight conditions. A review of the prior art reveals a few lights that are purportedly designed to address the above-described problems.

For example, U.S. Pat. No. 4,752,863 issued to Parrot discloses a pivotal cover mounted beneath a vanity-style mirror having lights mounted on a side or along the top thereof. A supplemental light mounted on the cover is activated whenever the cover is pivoted to an open position to illuminate the chin or the lower portion of the face.

U.S. Pat. No. 7,510,309 issued to Rizzo et al. discloses a light assembly including a base plate having a plurality of light fixtures adjustably positioned thereon.

U.S. Pat. No. 7,511,231 issued to Drane et al. discloses a lighted, floor-mounted electrical receptacle.

U.S. Pat. No. 7,494,258 issued to McNaught discloses a light apparatus for incorporation into a tiled wall, a panel, a ceiling or a floor.

U.S. Pat. No. 4,951,181 issued to Phillips discloses a light-diffusing glass block for incorporating into furniture, such as beds and bars.

Although the patent to Parrot discloses a vanity mirror that employs upwardly-projecting lights for illuminating a person's chin, a user must open the cover to activate the lights. Because the cover is mounted beneath a mirror, a user must lean forward so that the face is immediately above the lights in order to completely illuminate the lower face or chin. The farther that a user stands from the mirror, the less effective the device becomes. Furthermore, both the mirror and lights must be simultaneously replaced, which is laborious, inconvenient and costly. Finally, the open cover is unsightly and obtrusive.

Conversely, the present invention includes angularly-positioned lights embedded within a counter top for projecting light beams toward a lower portion of a user's face. When the lights are disabled, they are inconspicuously concealed so as not to detract from the aesthetic appearance of the counter top or mirror; in addition, because the lights are imbedded within the counter top, they completely illuminate the entire face of a person adjacent thereto without the need to lean toward the mirror.

SUMMARY OF THE INVENTION

The present invention relates to a light system for a vanity having a horizontal counter top surrounding a wash basin. Mounted on a wall, adjacent the counter top, is a mirror for reflecting a person's image. Along an upper edge of the mirror is a horizontal row of lights, similar to those typically mounted above conventional vanities. At least two light housings angularly depend from the lower surface of the counter top, each including an interior chamber, an open top and an outer wall. Received within the interior chamber is a compact, fluorescent lamp removably mounted within a light socket. An opening is formed on the counter top, immediately above the open top of each housing, for receiving a tempered-glass panel. Accordingly, activating the angled lamps and the conventional overhead lights illuminates a user's entire face thereby allowing the user to more accurately gauge the appearance of makeup in daylight conditions.

It is therefore an object of the present invention to provide a vanity light system that prevents shadowing of facial features.

It is another object of the present invention to provide a vanity light system that eliminates the disadvantages associated with conventional vanity lights.

Other objects, features, and advantages of the present invention will become readily apparent from the following detailed description of the preferred embodiment when considered with the attached drawings and the appended claims.

DESCRIPTION OF THE PREFERRED EMBODIMENT

Figure 1:
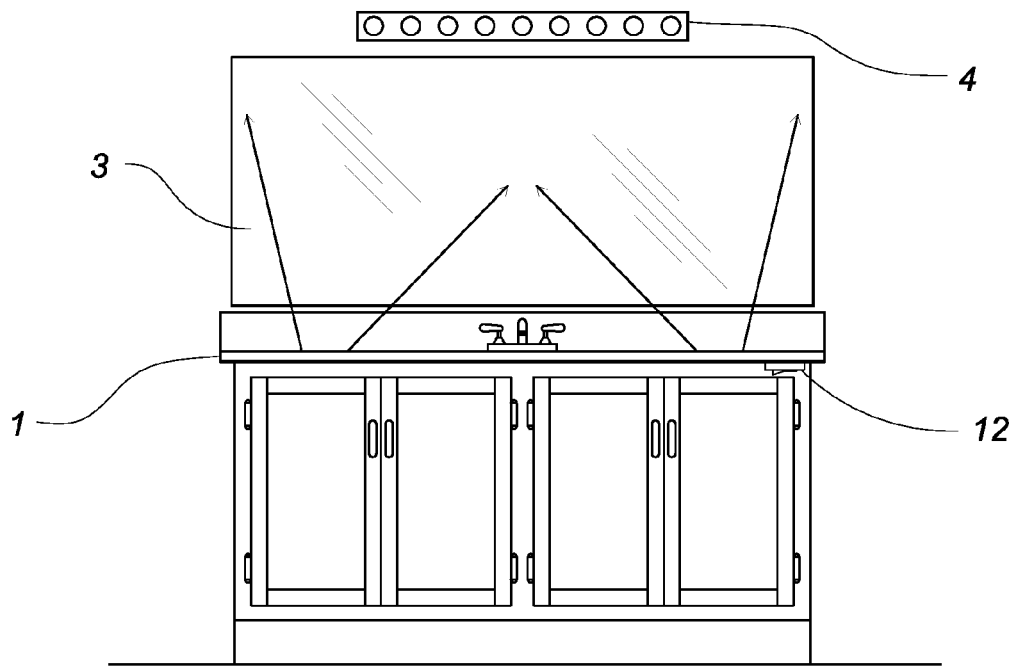
FIG. 1 is a front view of the vanity light system according to the present invention.
Figure 2:
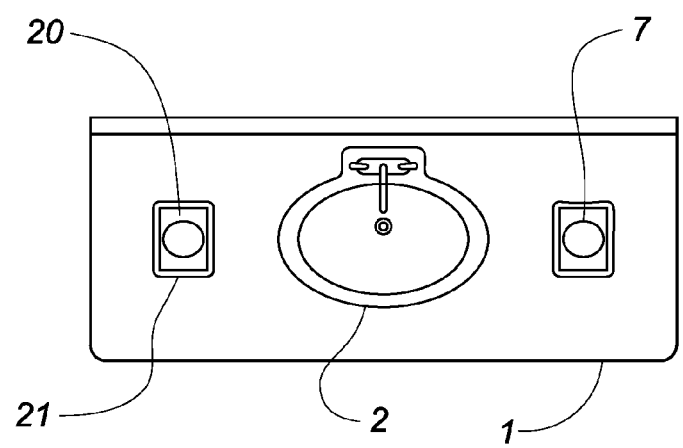
FIG. 2 is a top view of the vanity of FIG. 1.
Figure 3:
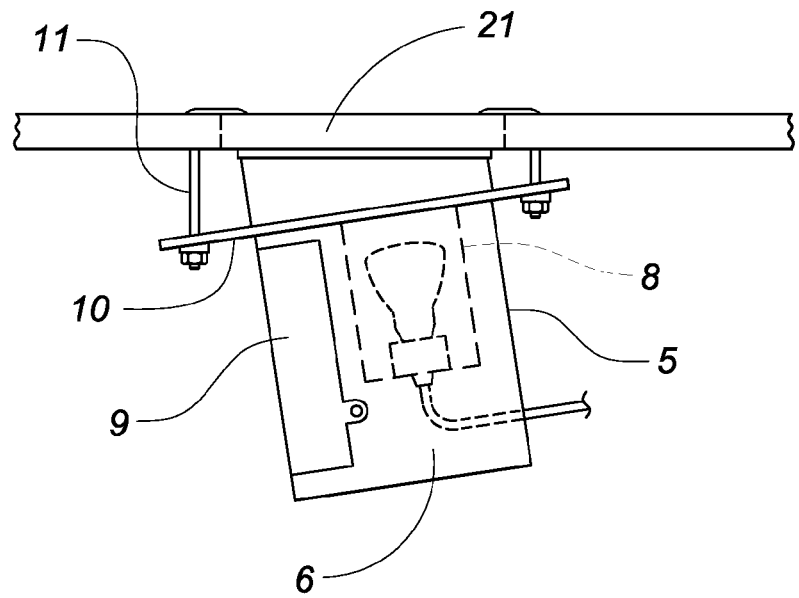
FIG. 3 is a side, sectional view of the counter top.
Figure 4:
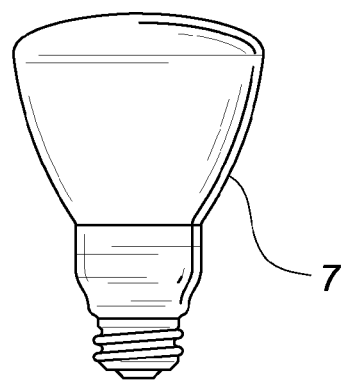
FIG. 4 is an isolated view of an exemplary lamp for use with the light system according to the present invention.

The present invention relates to a light system for a vanity having a horizontal counter top 1 surrounding a wash basin 2. Mounted on a wall, adjacent the counter top, is a mirror 3 for reflecting a person's image. Along an upper edge of the mirror is a horizontal row of lights 4, similar to those typically mounted above conventional vanities.

The light system according to the present invention is designed for vanities of the type described above. The system includes at least two light housings 5 angularly depending from the lower surface of the counter top; preferably, a housing is positioned adjacent each of two opposing sides of the wash basin, though the positions can be varied. Each housing includes an interior chamber, an open top and an outer wall 6. Received within the interior chamber is a compact fluorescent lamp 7 removably mounted within a light socket 8. A pivotal hatch 9 on the outer wall provides access to the interior chamber allowing a depleted lamp to be easily replaced. The housing is received within an oblique support bracket 10 that is suspended a predetermined distance below the lower surface of the counter top by mounting studs 11. An opening 21 is formed on the counter top, immediately above the open top of each housing, for receiving a tempered-glass panel 20.

An inset switch 12 beneath the counter top activates the lamps 7. Accordingly, activating the angled lamps 7 and the conventional overhead lights 4 illuminates a user's entire face thereby allowing the user to more accurately gauge the appearance of makeup in daylight conditions.

The above-described device is not limited to the exact details of construction and enumeration of parts provided herein. Furthermore, the size, shape and materials of construction of the various components can be varied.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. In combination with a vanity having a counter top and a mirror positioned adjacent thereto, said counter top having an upper surface, a lower surface and a wash basin, a light system comprising:

a pair of obliquely-extending lower lights imbedded in said counter top for projecting an angular light beam toward a user adjacent said counter top to illuminate an entire face.

2. The combination according to claim 1 wherein each of said lower lights includes:

a housing angularly depending from the lower surface of said counter top, said housing having an interior chamber, an open top and an outer wall;

an illuminable element received within said interior chamber.

3. The combination according to claim 2 wherein said housing further includes a pivotal hatch on the outer wall that provides access to the interior chamber allowing said illuminable element to be easily replaced.

4. The combination according to claim 3 further comprising:

an opening formed on said counter top, immediately above the open top of said housing;

a tempered-glass panel received within said opening.

5. The combination according to claim 4 wherein said housing is suspended by a support bracket depending from the lower surface of said counter top.

* * * * *